(12) United States Patent
Iuliano et al.

(10) Patent No.: US 12,298,924 B2
(45) Date of Patent: *May 13, 2025

(54) SORTING MEMORY ADDRESS REQUESTS FOR PARALLEL MEMORY ACCESS USING INPUT ADDRESS MATCH MASKS

(71) Applicant: Imagination Technologies Limited, Kings Langley (GB)

(72) Inventors: Luca Iuliano, Chesham (GB); Simon Nield, Wendover (GB); Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,187

(22) Filed: Nov. 13, 2023

(65) Prior Publication Data

US 2024/0078194 A1 Mar. 7, 2024

Related U.S. Application Data

(63) Continuation of application No. 17/588,078, filed on Jan. 28, 2022, now Pat. No. 11,816,044, which is a (Continued)

(30) Foreign Application Priority Data

Sep. 22, 2017 (GB) ...................... 1715416

(51) Int. Cl.
*G06F 13/16* (2006.01)
*G06F 12/02* (2006.01)
*G06F 12/06* (2006.01)

(52) U.S. Cl.
CPC ...... *G06F 13/1631* (2013.01); *G06F 12/0238* (2013.01); *G06F 12/06* (2013.01); (Continued)

(58) Field of Classification Search
None
See application file for complete search history.

(56) References Cited

U.S. PATENT DOCUMENTS 5,522,059 A 5/1996 Marushima et al.
6,438,660 B1 8/2002 Reams
(Continued)

*Primary Examiner* — Kevin Verbrugge
(74) *Attorney, Agent, or Firm* — Potomac Law Group, PLLC; Vincent M DeLuca

(57) ABSTRACT

Apparatus identifies a set of M output memory addresses from a larger set of N input memory addresses containing at least one non-unique memory address. A comparator block performs comparisons of memory addresses from a set of N input memory addresses to generate a binary classification dataset that identifies a subset of addresses from the set of input addresses, where each address in the subset identified by the binary classification dataset is unique within that subset. Combination logic units receive a predetermined selection of bits of the binary classification dataset and sort its received predetermined selection of bits into an intermediary binary string in which the bits are ordered into a first group identifying addresses belonging to the identified subset, and a second group identifying addresses not belonging to the identified subset. Output generating logic selects between bits belonging to different intermediary binary strings to generate a binary output identifying a set of output memory addresses containing at least one address in the identified subset.

20 Claims, 9 Drawing Sheets

Related U.S. Application Data continuation of application No. 16/817,907, filed on Mar. 13, 2020, now Pat. No. 11,249,925, which is a continuation of application No. 16/139,299, filed on Sep. 24, 2018, now Pat. No. 10,628,341.

(52) U.S. Cl.
CPC .. *G06F 13/1668* (2013.01); *G06F 2212/1024* (2013.01); *G06F 2212/1041* (2013.01); *G06F 2212/7209* (2013.01)

(56) References Cited

U.S. PATENT DOCUMENTS

| | | |
|---|---|---|
| 6,684,301 B1 | 1/2004 | Martin |
| 6,810,470 B1 | 10/2004 | Wiseman et al. |
| 8,108,625 B1 | 1/2012 | Coon et al. |
| 2003/0189848 A1 | 10/2003 | Lin |
| 2006/0129764 A1 | 6/2006 | Bellows et al. |
| 2008/0183982 A1 | 7/2008 | Sugahara et al. |
| 2013/0019084 A1 | 1/2013 | Orchard et al. |
| 2015/0134916 A1 | 5/2015 | Padalikar et al. |
| 2017/0270046 A1 | 9/2017 | Fenney et al. |

|   | Validity Identifier | Address |
|---|---|---|
| 1 | 1 | 101101 |
| 2 | 1 | 011101 |
| 3 | 0 | 111000 |
| 4 | 1 | 010100 |
| 5 | 0 | 101010 |
| 6 | 1 | 101101 |
| 7 | 1 | 011101 |
| ⋮ | ⋮ | ⋮ |
| N | | |

|   | Validity Identifier | Address | Binary Classifier | | | | | | |
|---|---|---|---|---|---|---|---|---|---|
| 1 | 1 | 101101 | 1 | | | | | | |
| 2 | 1 | 011101 | 1 | 1 | | | | | |
| 3 | 0 | 111000 | 0 | 0 | 0 | | | | |
| 4 | 1 | 010100 | 1 | 1 | 1 | 1 | | | |
| 5 | 0 | 101010 | 0 | 0 | 0 | 0 | 0 | | |
| 6 | 1→0 | 101101 | 0 | 0 | 0 | 0 | 0 | 0 | |
| 7 | 1→0 | 011101 | 1 | 0 | 0 | 0 | 0 | 0 | 0 |
| ⋮ | ⋮ | ⋮ | | | | | | | |
| N | | | | | | | | | |

| | 1 | 2 | 3 | 4 | 5 | 6 | 7 |
|---|---|---|---|---|---|---|---|
| 7 | 0 | 1 | 0 | 0 | 0 | 0 | 1 |
| 6 | 1 | 0 | 0 | 0 | 0 | 1 | 0 |
| 5 | 0 | 0 | 0 | 0 | 0 | 0 | 0 |
| 4 | 0 | 0 | 0 | 1 | 0 | 0 | 0 |
| 3 | 0 | 0 | 0 | 0 | 0 | 0 | 0 |
| 2 | 0 | 1 | 0 | 0 | 0 | 0 | 1 |
| 1 | 1 | 0 | 0 | 0 | 0 | 1 | 0 |

| | Address |
|---|---|
| 1 | 101101 |
| 2 | 011101 |
| 3 | 111000 |
| 4 | 010100 |
| 5 | 101010 |
| 6 | 101101 |
| 7 | 011101 |
| N | • • • |

301

SORTING MEMORY ADDRESS REQUESTS FOR PARALLEL MEMORY ACCESS USING INPUT ADDRESS MATCH MASKS

CROSS-REFERENCE TO RELATED APPLICATIONS AND CLAIM OF PRIORITY

This application is a continuation under 35 U.S.C. 120 of application Ser. No. 17/588,078 filed Jan. 28, 2022, now U.S. Pat. No. 11,816,044, which is a continuation of prior application Ser. No. 16/817,907 filed Mar. 13, 2020, now U.S. Pat. No. 11,249,925, which is a continuation of prior application Ser. No. 16/139,299 filed Sep. 24, 2018, now U.S. Pat. No. 10,628,341, which claims foreign priority under 35 U.S.C. 119 from United Kingdom Application No. 1715416.2 filed Sep. 22, 2017, the contents of which are incorporated by reference herein in their entirety.

FIELD OF THE INVENTION

This invention relates to sorting memory address requests within a computer system for parallel memory access.

BACKGROUND OF THE INVENTION

A computer processor system may include one or more processor units for performing processing operations. Each of these processor units may request access to memory (e.g. to read or write data) as part of executing instructions to perform one or more processing operations. Each memory access request may specify a memory address identifying a region of memory to be accessed. In this context, a processor unit could for example be a processor, processor core, a multi-core processor, or some other type of unit capable of executing instructions to perform one or more processing operations, such as a digital signal processor (DSP). The computer processor system could for example be a central-processor unit (CPU), a graphics processing unit (GPU).

It is common for computer processor systems to be arranged so that multiple processing operations can be performed in parallel. For example, some processor units are capable of executing multiple threads in parallel. In other examples, a computer processor system may include multiple processor units operating in parallel, each of which may execute a single thread, or multiple threads in parallel. As a consequence, a computer processor system may generate a number of memory access requests; in some systems, multiple memory access requests may be generated in a single clock cycle. In other cases, multiple memory access requests may be generated over one or more clock cycles.

To reduce the latency in the operation of the computer processor system, multiple memory accesses may be made in parallel (e.g., a specified number of memory addresses across one or more blocks of memory may be accessed in parallel). Parallelising the memory accesses may be particularly convenient when the access requests reference memory addresses within a block, or blocks, of memory not local to the processor units. For example, if the one or more processor units were implemented as part of a system-on-chip (SoC), one or more blocks of memory that can be accessed by the processor unit(s) may be located off-chip, for example to reduce the size of the chip.

The number of memory accesses that can be made in parallel may be restricted to a specified maximum value. This value may for example be limited by data bandwidth. For instance, if the processor unit(s) form part of a SoC, the rate at which data can be communicated on and off the chip may be limited by the data bandwidth limit of the memory bus used to transfer data to/from memory.

In some cases, the number of pending memory access requests may exceed the maximum number of memory accesses that can be made in parallel. Furthermore, some of the pending memory access requests may not be unique, for example the pending memory access requests may contain multiple requests to access the same memory address. Under these circumstances, a set of parallel memory access requests may contain multiple requests for the same memory address, resulting in an inefficient memory access scheme.

SUMMARY

According to the present invention there is provided an apparatus configured to identify a set of M output memory addresses from a larger set of N input memory addresses containing at least one non-unique memory address, the apparatus comprising: a comparator block configured to perform comparisons of memory addresses from a set of N input memory addresses to generate a binary classification dataset that identifies a subset of addresses from the set of input addresses, where each address in the subset identified by the binary classification dataset is unique within that subset; a plurality of combination logic units, each combination logic unit being configured to: receive a predetermined selection of bits of the binary classification dataset; and sort its received predetermined selection of bits into an intermediary binary string in which the bits are ordered into a first group identifying addresses belonging to the identified subset, and a second group identifying addresses not belonging to the identified subset; and output generating logic configured to select between bits belonging to different intermediary binary strings to generate a binary output identifying a set of output memory addresses containing at least one address in the identified subset.

The binary classification dataset may comprise N bits, each bit corresponding to a respective input memory address, the value of each bit indicating whether or not the corresponding memory address forms part of the identified subset.

The bit(s) of the binary output identifying the at least one address in the identified subset may be unordered within the output.

Each address in the set of input addresses may be associated with a validity identifier indicating whether the address is valid or invalid.

Each address in the set of input addresses that is not in the identified subset may be at least one of: an invalid address; or equal to one of the addresses in the identified subset.

The set of input memory addresses may contain N addresses, and the comparator block may be configured to perform the comparison of input addresses by comparing address $a_i$ with address $a_j$ for $i=1, \ldots N-1$ and $j=i+1, \ldots N$.

The set of input memory addresses may contain N addresses, and the comparator block may be configured to perform the comparison of input addresses by comparing address $a_i$ with address $a_j$, for $i=1, \ldots N$ and $j=i-1, \ldots 1$.

The comparator block may be configured to generate the binary classification dataset by associating a first bit value with each address $a_j$ that is determined to be both: a valid address and not equal to address $a_i$, and to associate a second bit value to each address $a_j$ that is determined to be at least one of: an invalid address or equal to address $a_i$, the comparator block being further configured to identify an address $a_j$ as invalid in response to determining that address $a_j$ is equal to address $a_i$.

The comparator block may be configured to generate the binary classification dataset by associating a first bit value with each address $a_i$ that is both: a valid address and not equal to any address $a_j$, and to associate a second bit value to each address $a_i$ that is either: an invalid address or equal to at least one other address $a_j$.

The first bit values in the binary classification dataset may identify the subset of addresses in which each address is unique.

The comparator block may be further configured to generate from the comparison of input addresses a match mask indicating, for each input address, which of the other input addresses match that input address.

The apparatus may further comprise address matching logic configured to identify, using the match mask, each input address that matches the at least one address in the identified subset that is identified by the binary output.

The binary output may be an M-bit output, and the output generating logic may be configured to select between bits belonging to different intermediary binary strings to generate an M-bit binary output that identifies M addresses in the identified subset when the number of addresses in said subset is greater than or equal to M.

Each combination logic unit may be configured to sort its received predetermined selection of bits into an intermediary binary string containing fewer bits than the number of the predetermined selection of bits received by that combination logic unit.

Each combination logic unit may comprise:
a plurality of sort units each configured to:
  receive a portion of the received predetermined selection of bits; and
  sort the received portion of bits to group together the bits identifying addresses belonging to the identified subset to generate a preliminary binary string; and
one or more merge units, each of the one or more merge units being configured to receive a plurality of preliminary binary strings and to merge those preliminary binary strings to group together the bits from each received preliminary binary string that identify addresses belonging to the identified subset.

The output generating logic may comprise a plurality of selecting units, each configured to generate a respective bit of the binary output.

Each selecting unit may be configured to select between a pair of bits from respective intermediary binary strings to generate a bit of the binary output.

Each selecting unit may be configured to output a bit that does not identify an address in the identified subset only in response to receiving a pair of bits that both do not identify an address in the identified subset.

Each selecting unit may be associated with a pair of combination logic units and be configured to select between a pair of bits from respective intermediary binary strings formed by those pair of combination logic units.

Each combination logic unit may be configured to sort its received predetermined selection of bits into an intermediary binary string of M bits.

Each selecting unit n may be configured to select between a bit $b_n$ from a first intermediary binary string, and a bit $b_m$ from a second intermediary binary string, where $n=1, \ldots M$, and $m=M+1-n$.

There may be a processor comprising the apparatus in accordance with any of the examples described herein.

The processor may be a single instruction multiple data (SIMD) processor.

In accordance with a second aspect of the present disclosure there is provided a method of identifying a set of M output memory addresses from a larger set of N input memory addresses containing at least one non-unique memory address comprising: performing a comparison of memory addresses from a set of N input memory addresses to generate a binary classification dataset that identifies a subset of addresses from the set of input addresses, where each address in the subset identified by the binary classification dataset is unique within that subset; at each of a plurality of combination logic units: receiving a predetermined selection of bits of the binary classification dataset; and sorting its received predetermined selection of bits into an intermediary binary string in which the bits are ordered into a first group identifying addresses belonging to the identified subset, and a second group identifying addresses not belonging to the identified subset; and selecting between bits belonging to different intermediary binary strings to generate a binary output identifying a set of output memory addresses containing at least one address in the identified subset.

The binary classification dataset may comprise N bits, each bit corresponding to a respective input memory address, the value of each bit indicating whether or not the corresponding memory address forms part of the identified subset.

The bit(s) of the binary output may identify the at least one address in the identified subset are unordered within the output.

Each address in the set of input addresses may be associated with a validity identifier indicating whether the address is valid or invalid.

Each address in the set of input addresses that is not in the identified subset may be at least one of: an invalid address; or equal to one of the addresses in the identified subset.

The set of input memory addresses may contain N addresses, and the method may comprise performing the comparison of input addresses by comparing address $a_i$ with address $a_j$ for $i=1, \ldots N-1$ and $j=i+1, \ldots N$.

The set of input memory addresses may contain N addresses, and the method may comprise performing the comparison of input addresses by comparing address $a_i$ with address $a_j$, for $i=1, \ldots N$ and $j=i-1, \ldots 1$.

The method may comprise generating the binary classification dataset by associating a first bit value with each address $a_j$ that is determined to be both: a valid address and not equal to address $a_i$, and associating a second bit value to each address $a_j$ that is determined to be at least one of: an invalid address or equal to address $a_i$, the method may further comprise identifying an address $a_j$ as invalid in response to determining that address $a_j$ is equal to address $a_i$.

The method may comprise generating the binary classification dataset by associating a first bit value with each address $a_i$ that is both: a valid address and not equal to any address $a_j$; and associating a second bit value to each address $a_i$ that is either: an invalid address or equal to at least one other address $a_j$.

The first bit values in the binary classification dataset may identify the subset of addresses in which each address is unique.

The method may further comprise generating from the comparison of input addresses a match mask indicating, for each input address, which of the other input addresses match that input address.

The method may further comprise identifying, using the match mask, each input address that matches the at least one address in the identified subset that is identified by the binary output.

The binary output may be an M-bit output, and the selecting step may comprise selecting between bits belonging to different intermediary binary strings to generate an M-bit binary output identifying M addresses in the identified subset when the number of addresses in said subset is greater than or equal to M.

The method may comprise, at each of the plurality of combination logic units: sorting the received predetermined selection of bits into an intermediary binary string containing fewer bits than the number of the predetermined selection of bits received by that combination logic unit.

The method may comprise, at each combination logic unit:
at each of a plurality of sort units:
receiving a portion of the received predetermined selection of bits; and
sorting the received portion of bits to group together the bits identifying addresses belonging to the identified subset to generate a preliminary binary string; and
at each of one or more merge units:
receiving a plurality of preliminary binary strings and merging those preliminary binary strings to group together the bits from each received preliminary binary string that identify addresses belonging to the identified subset.

The selecting step may comprise, at each of a plurality of selecting units, generating a respective bit of the binary output.

The method may comprise, at each selecting unit, selecting between a pair of bits from respective intermediary binary strings to generate a bit of the binary output.

The method may comprise, at each selecting unit, outputting a bit that does not identify an address in the identified subset only in response to receiving a pair of bits that both do not identify an address in the identified subset.

The method may comprise, at each selecting unit associated with a pair of combination logic units, selecting between a pair of bits from respective intermediary binary strings formed by those pair of combination logic units.

The method may comprise, at each combination logic unit, sorting its received predetermined selection of bits into an intermediary binary string of M bits.

The method may comprise, at each selecting unit n, selecting between a bit $b_n$ from a first intermediary binary string, and a bit $b_m$ from a second intermediary binary string, where $n=1, \ldots M$, and $m=M+1-n$.

There may be provided an apparatus as described herein embodied in hardware on an integrated circuit.

There may be provided a method of manufacturing, using an integrated circuit manufacturing system, an apparatus as described herein.

There may be provided an integrated circuit definition dataset that, when processed in an integrated circuit manufacturing system, configures the system to manufacture an apparatus as described herein.

There may be provided a non-transitory computer readable storage medium having stored thereon a computer readable description of an integrated circuit that, when processed in an integrated circuit manufacturing system, causes the integrated circuit manufacturing system to manufacture an apparatus as described herein.

There may be provided an integrated circuit manufacturing system configured to manufacture an apparatus as described herein.

There may be provided an integrated circuit manufacturing system comprising:
a non-transitory computer readable storage medium having stored thereon a computer readable integrated circuit description that describes an apparatus as described herein;
a layout processing system configured to process the integrated circuit description so as to generate a circuit layout description of an integrated circuit embodying the apparatus; and
an integrated circuit generation system configured to manufacture the apparatus according to the circuit layout description.

There may be provided an apparatus configured to perform any method as described herein.

There may be provided computer program code for performing a method as described herein.

There may be provided a non-transitory computer readable storage medium having stored thereon computer readable instructions that, when executed at a computer system, cause the computer system to perform a method as described herein.

BRIEF DESCRIPTION OF DRAWINGS

The present invention will now be described by way of example with reference to the accompanying drawings. In the drawings:

FIG. 3A illustrates the inputs received by the address sorting unit.

FIG. 3B illustrates how a series of memory comparisons are performed to generate a binary classification dataset.

FIG. 3C shows a match mask.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure is directed to sorting a set of N input memory addresses to identify each different address (e.g. each different address value) within that set. The set of input addresses may be addresses to which access has been requested. The identified subset of different address values is then used to generate a set of M unique output memory addresses, where M<N. The output set of memory addresses may be such that each address within the output set is unique within that set, but may not be unique within the larger set of input addresses. That is, the input set of N memory addresses may contain a number of different address values (≤N), but one or more of those address values may be included multiple times within the input set. In contrast, the term "unique", as used herein to refer to a memory address within a particular set, subset, etc., means that the memory address is not equivalent to any other memory address within that set, subset etc. If there are an insufficient number of different address values to generate an output set of addresses in which each address is unique (i.e., if the number of different address vales is less than M), then the output set of addresses contains the maximum number of different addresses.

Thus, if an input set of memory addresses contains multiple addresses with the same address value, output sets of memory addresses can be generated so that the address value is output only once. The set of output memory addresses can then be used to access the regions of memory identified by the memory addresses within the output set. This can improve the efficiency of memory access, by reducing, or in some cases potentially eliminating, multiple accesses to the same memory address when granting access to addresses in the input set.

Examples of how the output set of memory addresses can be generated will be described in more detail below.

Figure 1:
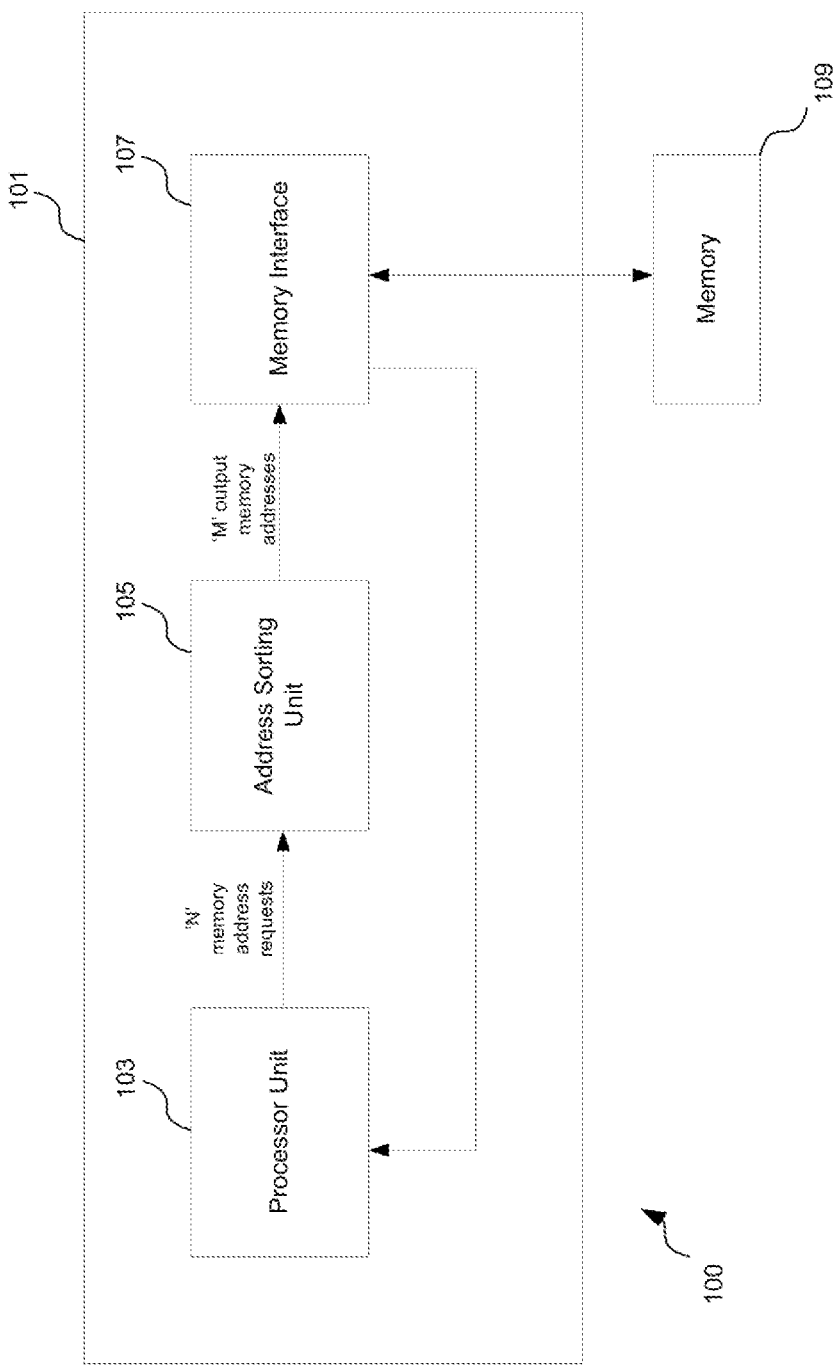
FIG. 1 shows an overview of a computer apparatus.

FIG. 1 shows an example computer processing system 100. The computer processor system comprises a central processing unit (CPU) or a graphics processing unit (GPU) 101 and a memory 109. The memory 109 is shown as being external of the unit 101. If the unit 101 formed part of a system of on chip (SoC), the memory 109 could be external of the chip, i.e. memory 109 could be an off-chip memory.

The unit 101 comprises a processor unit 103, an address sorting unit 105, and a memory interface 107. The processor unit is configured to perform processing operations. To perform the processing operations, the processor unit may execute one or more instructions. The processor unit could take many different forms. For example, the processor unit could be a processor; a processor core; a multi-core processor or some other type of unit capable of executing instructions to perform one or more processing operations, such as a DSP. The processor unit may be capable of performing multiple processing operations in parallel. The processor unit could for example be a single-instruction-multiple-data (SIMD) processor. The processor unit may be capable of scheduling and executing multiple threads in parallel. Though in this example the computer processor system comprises only a single processor unit 103, in other examples the computer processor system may comprise multiple processor units. Each of these multiple processor units may operate in parallel. If the unit 101 comprises multiple processor units 103, then the units may operate independently of each other; e.g., each processor unit may be capable of independently scheduling and executing threads.

The processor unit 103 generates a set of N memory address requests. Each address request may specify a memory address value identifying a region of the memory 109 to be accessed. Each address value may be a fixed-length sequence of digits. The bit-width of each memory address value may be implementation-specific. The N address requests may be generated by the processor unit 103 in a single processor cycle, e.g. a single clock cycle. Alternatively, the N memory address requests may be generated over multiple clock cycles. In some instances, memory address requests may not be generated in discrete sets of N, but may be generated on an ad-hoc basis by the processor unit. In this case, the set of N memory address requests may refer to the N oldest pending memory requests, with the set of N address requests being updated each time a request is granted. Thus, in general, the N memory address requests may be a set of N pending requests.

The address sorting unit 105 receives the N memory addresses specified by the set of N memory access requests. The operation of the address sorting unit will be described in more detail below, but briefly: it operates to generate a set of M output memory addresses from the set of N input memory addresses specified by the received set of memory address requests. The number of memory addresses in the output set is less than the number of memory addresses in the input set (i.e., M<N). Each address within the set of M output memory addresses may be unique within that output set (i.e., the sorting unit outputs a unique set of M output memory addresses).

The M output memory addresses are then input into memory interface 107, which accesses the appropriate (unique) regions of memory 109 as specified by those M addresses.

Though memory 109 is shown in FIG. 1 as a single block, it will be appreciated that in other examples, the memory access requests may request access to multiple blocks of memory. A single set of M memory addresses may contain addresses for multiple blocks of memory.

Figure 2:
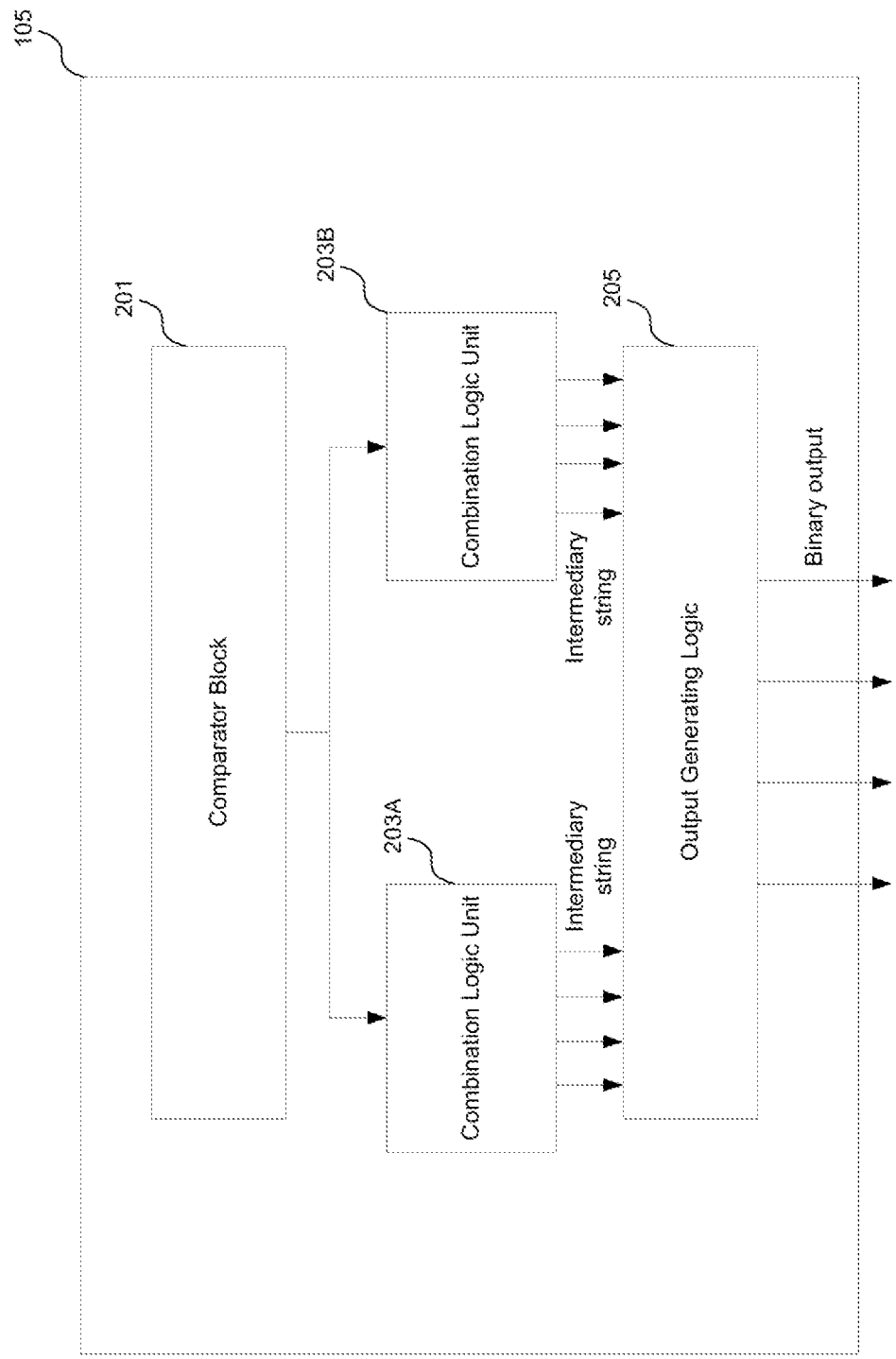
FIG. 2 shows an example of an address sorting unit forming part of the computer apparatus shown in FIG. 1.

The address sorting unit 105 is shown in more detail in FIG. 2. The address sorting unit 105 comprises a comparator block 201, a plurality (in this example two) of combination logic units 203A and 203B, and output generating logic 205.

The operation of the address sorting unit 105 will now be described, with reference to the flowchart in FIG. 6. In the examples that follow, the set of N input memory addresses received by the address sorting unit contains 32 addresses (i.e., N=32), and the set of M output memory addresses contains four addresses (i.e., M=4). It is to be understood that these values have been chosen merely for the purposes of illustration, and that the following description is applicable to other values of N and M.

At step 601, the address sorting unit 105 performs a comparison of the input memory addresses to generate a binary classification dataset that identifies a subset of addresses from the set of input addresses. Each address in the subset identified by the binary classification dataset is unique within that subset (but may not be unique within the input set).

Step 601 is performed by the comparator block 201. The comparator block may receive as an input the set of N input addresses. The comparator block may also receive a set of N validity identifiers, each validity identifier indicating whether a respective address in the set of input addresses is valid or invalid. Invalid addresses may arise, for example, if the number of current memory address requests is less than N. In these circumstances, the remaining input ports to the comparator block (i.e., the input ports not containing a current memory address request) may contain the address from a previous set of input memory address requests, and be labelled as invalid. (The set of N input addresses may be received in the format of an address vector. The address vector may be formed of N×$Add_{BW}$ bits, where $Add_{BW}$ is the bitwidth of each memory address (and N being the number of addresses in the input set). The set of validity identifiers may be in the format of a validity vector. The validity vector may be formed of N bits, where each bit of the vector indicates whether a corresponding input address is valid or invalid. Thus, each validity identifier may be a binary identifier.

The inputs to the comparator block 201 are illustrated schematically in FIG. 3A. The set of N input addresses are shown generally in column 301, and the set of N validity identifiers are shown generally in column 303. It can be seen that each validity identifier corresponds to—and indicates the validity of—a respective input address.

Each input memory address is a sequence of digits, in this example six digits. Each address in the input set may be of a fixed length. Each address in the input set may be of equal length. It will be understood that each address is represented as a sequence of six digits here merely for ease of illustration, and that in other implementations, each address may be formed of a different number of bits.

It is noted that, for the purposes of clarity, only seven input memory addresses and seven validity identifiers are shown in FIG. 3A.

The comparator block 201 performs a series of address comparisons for the input addresses to identify a subset of addresses within which each address is unique. An example scheme for comparing the input memory addresses to identify this subset will now be described with reference to FIG. 3B.

In the first step of the scheme, the comparator block compares the first memory address (having an address value 101101) with each of the other N−1 addresses in the received input set. If the addresses do not match, and the validity identifier of the address being compared to the first address indicates that the address is valid, that comparison is associated with a first binary value (in this example, the value '1'). If the addresses do match, and/or the validity identifier of the address being compared to the first address indicates the address is not valid, the comparison is associated with a second binary value (in this example, '0'). The results of the comparisons of the first address with each of the other addresses in the input set in accordance with this scheme is illustrated in column 305. It can be seen that, since address 1 matches address 6, a value of '0' is associated with that comparison. A value of '0' is also associated with the comparison of address 1 with addresses 3 and 5, because addresses 3 and 5 are indicated as invalid by their respective validity identifiers. A further step of the scheme is to identify an address as invalid in response to a determination that the address matches the first address. This may be done by changing the validity identifier associated with the address(es) that are determined to match the first address. Thus, in this example, in response to determining that address 6 matches the first address, the validity identifier associated with address 6 is altered to indicate that address 6 is not valid.

In the second step of the scheme, the second memory address is compared to each of the remaining N−2 addresses of the input set. As before, a first binary value ('1') is associated with a comparison if the second memory address does not match the address to which it is being compared and that address is indicated as being valid by its validity identifier. A second binary value ('0') is associated with a comparison if the second memory address matches the address to which it is being compared, and/or the validity identifier for that address indicates the address being compared to the second address is invalid. The results of the comparisons of the second memory address with the remaining N−2 addresses are shown in column 307. Since address 2 matches address 7, that comparison is associated with the value '0'. It will also be noticed that, though addresses 2 and 6 do not match, a value of '0' is associated with this comparison because the validity identifier for address 6 was amended to '0' to indicate the address is invalid following the prior comparison of address 6 with address 1.

The above process is repeated for each of the remaining N−2 addresses. Thus, for a set of N input addresses, the comparator block 201 performs a series of comparisons of address $a_i$ with address $a_j$ for i=1, ... N, and j=i+1, ... N. The comparator block therefore performs N·(N−1)/2 address comparisons. The comparator block performs these comparisons to associate with each address $a_k$ in the input set a binary classifier value. Put another way, the comparator block 201 may compare each address $a_i$ with each subsequent address $a_{j=i+1, ... N}$, repeated for each address $a_{i \in (1, ... N)}$ in the set of N input addresses. A first binary classification value (in this example a '1') is associated to each subsequent address $a_j$ that is determined to be both: (i) a valid address (i.e. the address is associated with a validity identifier that indicates the address is valid); and (ii) not equal to address $a_i$, with the comparator block identifying said subsequent address $a_j$ as invalid in response to determining that the address is equal to address $a_i$. The comparator block associates a second binary classification value (in this example, a '0') to each address $a_j$ that is determined to be at least one of: (i) an invalid address (i.e. associated with a validity identifier that indicates the address is invalid); and (ii) equal to address $a_i$.

The set of binary classifier values associated with the input addresses following the operation of the comparator block 201 are indicated in FIG. 3B at 309. This set of binary classifier values 309 may be referred to as a binary classification dataset. In this example, the binary classification dataset is an N bit vector, where each bit of the vector contains a binary classification value for a respective input address.

The above-described scheme is a sequential scheme; i.e., the second step of the scheme is initiated after the first step of the scheme has completed, the third step of the scheme is initiated after the second step of the scheme has completed, and so on. In general, step i is initiated only after step i−1 has completed. To reduce latency, the comparator block 201 may in other examples implement a parallel scheme to perform the address comparisons for the input addresses to identify a subset of addresses within which each address is unique.

The comparator block may implement the parallel scheme by performing N comparison steps. Each of the N comparison steps may be initiated in parallel, i.e. concurrently. Each comparison step i determines the binary classifier value for a respective address i in the set of N input addresses. Each step i may compare a corresponding input address i with each one of i−1 preceding addresses of the set of input addresses. Thus, in comparison step 1, address 1 isn't compared with any other addresses of the set of N input addresses. In comparison step N, address N is compared with each of the N−1 preceding addresses of the input set. Thus, each comparison step i may include i−1 comparisons. A total of N·(N−1)/2 comparisons are performed in total across the N comparison steps. For each comparison step i, the comparator block compares a corresponding memory address i with a subset of i−1 other addresses in the input set and, if at least one of those i−1 subset of addresses is: 1) equal to the corresponding memory address i; and 2) a valid address, the comparator block updates the validity identifier of corresponding memory address i to the second binary value (e.g. '0').

Put another way, the comparator block may be configured to implement the parallel scheme by performing N comparison steps, where for each comparison step i, the comparator block performs the following logical equation:

$$valid_{new,i} = valid_{old,i} \text{ AND NOT}(((address_i == address_j) \text{ AND } valid_1) \text{ OR } ((address_i == address_2) \text{ AND } valid_2) \text{ OR } \ldots \text{ OR}((address_i == address_{i-1}) \text{ AND } valid_{i-1})) \tag{1}$$

where $valid_{new,i}$ is the value of the validity identifier for address i following comparison step i (which is the binary classifier value associated with that address); $valid_{old,j}$ is the original value of the validity identifier for address prior to comparison step i being performed; $valid_1, \ldots valid_{i-1}$ are received values of the validity identifiers for addresses $1, \ldots i-1$, and AND, NOT and OR are logical operators.

Thus, in summary, the comparator block 201 may generate the binary classification dataset by implementing a scheme in which each input address $a_{i \in (1, \ldots N)}$ is compared with each previous address $a_{j=1, \ldots j-1}$ in the input set to determine a binary classification value for address $a_i$. A first binary classification value (in this example a '1') is associated to each input address $a_i$ that is determined to be both: (i) a valid address (i.e. the address is associated with a validity identifier that indicates the address is valid); and (ii) not equal to any previous address $a_j$. The comparator block associates a second binary classification value (in this example, a '0') to each input address $a_i$ that is determined to be at least one of: (i) an invalid address (i.e. associated with a validity identifier that indicates the address is invalid); and (ii) equal to at least one previous address $a_j$.

Thus, in effect, each input address associated with a first binary classification value in the binary classification dataset 309 is identified as being a valid address and the first occurrence of that address within the set of input addresses when that set is serially traversed in order.

All input addresses associated with the first binary classification value in the classification dataset 309 therefore define a subset of unique addresses; i.e., each address within the subset is unique within the subset. In this example, the subset of unique addresses identified by the classification dataset includes only addresses 1, 2 and 4 for the first seven input addresses. However, each address within the subset is not necessarily unique within the set of N input addresses. For example, address 1 is unique within the subset of addresses identified by the binary classification dataset (there being no other address having a binary classification of '1' in the dataset 309 that is equal to address 1), but is not unique within the set of N input addresses (address 1 being equal to address 6). In other words, the comparator block 201 generates the binary classification dataset 309 so that, if the set of N input addresses contains multiple addresses having the same address value, only one of those addresses is associated with the first binary classification value in the classification dataset (i.e. only one of those addresses is included within the subset identified by the binary classification dataset).

The scheme described above allows all addresses in the input set to be identified that are both: valid; and the first occurrence of that address within the input set when the input set is traversed in order. In other words, each address in the set of N input addresses that is not in the subset identified by the binary classification dataset 309 (i.e. each input address associated with a '0' in the classification dataset) is at least one of: an invalid address; or equal to one of the addresses in the identified subset.

As well as generating the binary classification dataset 309, the comparator block 201 may additionally generate a match mask that indicates, for each address in the set of N input addresses, which addresses in the input set match that address. In some examples, the match mask may not take into account the validity identifiers of the input addresses. That is, the match mask may simply indicate, for each address in the set of N input addresses, which addresses in the input set match that address independently of the validity identifiers for those addresses. In other examples, the match mask may indicate, for each address in the set of N input addresses, which addresses in the input set are both valid and match that address. The match mask may be in the form of an N×N bit matrix.

FIG. 3C shows an example match mask generated by the comparator block 201 for the set of input values shown in column 301. The match mask is shown at 311. The match mask is a binary mask, with a first binary value (in this example '1') being used to denote that a pair of input addresses are both valid and match, and a second binary value (in this example '0') being used to denote that a pair of addresses do not match and/or are invalid. The match mask for each input address i may be given by a row i or column i of the matrix 311. Thus, the match mask for each input address may take the form of an N-bit vector, with each bit indicating whether address i matches a valid respective address in the input set. In other words, for each address in the input set (shown in column 301), the match mask identifies the valid addresses in the input set that match that address. The purpose of the match mask will be described in more detail below.

Figure 6:
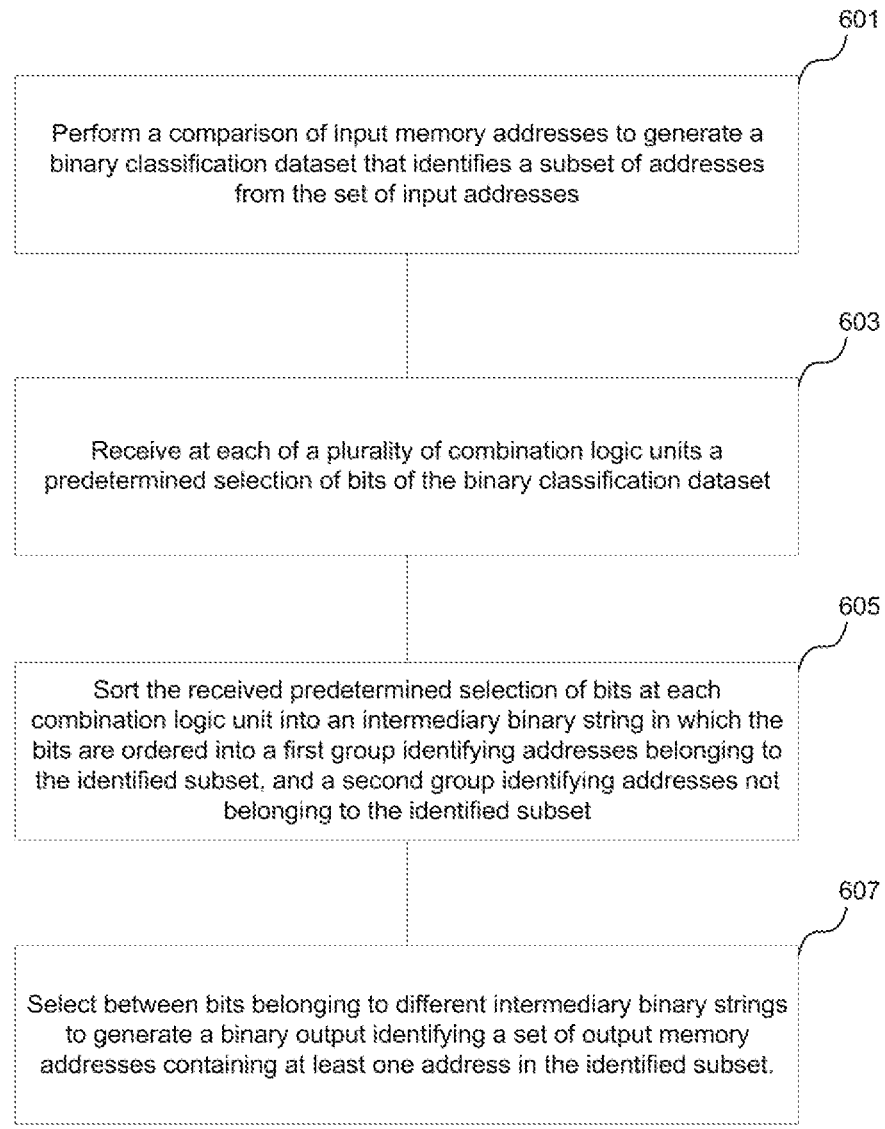
FIG. 6 shows a flowchart illustrating the steps of identifying a set of output addresses from a set of input addresses.

Retuning back to FIG. 6, and at step 603 each of the plurality of combination logic units 203A and 203B receives a predetermined selection of bits of the binary classification dataset. That is, each of the plurality of combination logic units receives a respective portion, or subsection, of the binary classification dataset.

The bits of the binary classification dataset may be distributed to the combination logic units so that all the bits of the dataset are allocated across the combination logic units. The bits of the binary classification dataset may be allocated to the logic units in accordance with a specified allocation scheme. This allocation scheme may be predetermined. In this particular example, where the address sorting unit 105 contains two combination logic units, each combination logic unit 203A and 203B may be configured to receive half of the bits of the binary classification dataset. For instance, logic unit 203A may receive bits 1 to N/2 of the binary classification dataset, and logic unit 203B may receive bits N/2+1 to N of the binary classification dataset. It is noted that each bit of the binary classification dataset is associated with an address value and a match mask. The following passages describe various operations performed on the binary classification bits by the combination logic units 203A, 203B and the output generating logic 205. Each of these operations is also performed on the corresponding address values and match masks so that at each stage of processing, a binary classification bit remains associated with its corresponding address value and match mask. This enables the address value and match mask to be read for each binary classification bit (i.e. each binary classifier value) output from the output generating logic 205.

At step 605, each combination logic unit 203 sorts its received selection of bits of the binary classification dataset into an intermediary binary string in which the bits are ordered into a first group identifying addresses belonging to the identified unique subset, and a second group identifying addresses not belonging to the identified unique subset. In other words, the bits of each intermediary binary string are divided into two groups: a first group of contiguous bits each having the first binary classification value, and a second group of contiguous bits each having the second binary classification value. Thus, within the intermediary binary string, the bits having the first binary classification value are contiguous, and the bits having the second binary classification value are contiguous.

Figure 4:
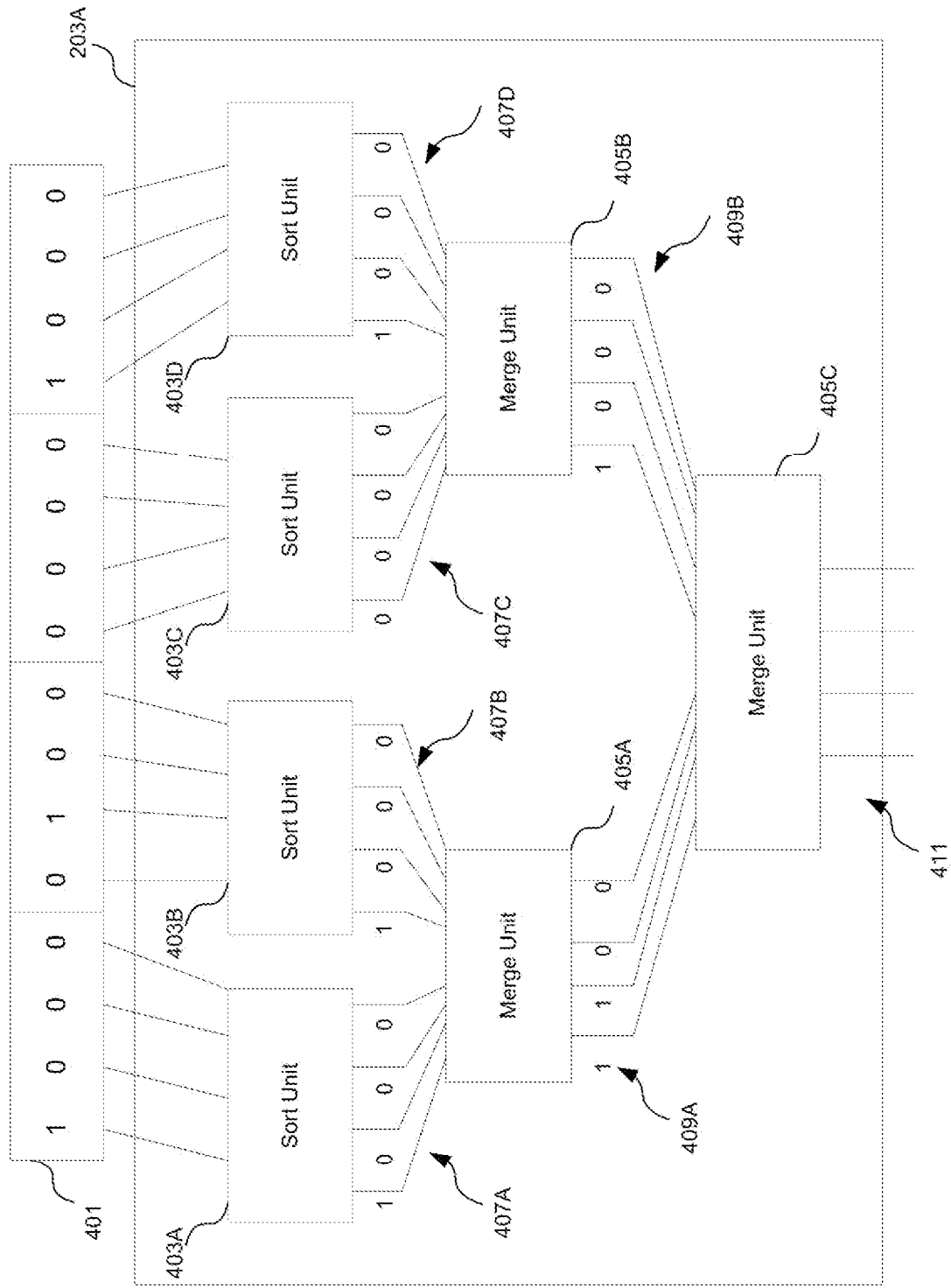
FIG. 4 shows an example of a combination logic unit forming part of the address sorting unit.

FIG. 4 shows a more detailed view of an exemplary combination logic unit 203. Logic unit 203A is shown here for illustration, but it will be appreciated that logic unit 203B has a similar structure. The predetermined selection of bits of the binary classification dataset received by the logic unit 203A are labelled 401. Because in this example the binary classification dataset contains 32 bits (because the set of input addresses contains 32 addresses), and there are two logic units 203A,B within the address sorting unit, each logic unit 203 receives 16 bits of the binary classification dataset. Examples values for the predetermined selection of bits 401 have been chosen to illustrate the operation of the logic unit 203A.

The logic unit 203A comprises a plurality of sort units 403A-D, and a plurality of merge units 405A-C. Each of the sort units receives a portion of the predetermined selection of bits received by the logic unit 203A. In particular, the unit 203A comprises four sort units, each configured to receive four bits of the received predetermined selection of bits 401.

Each sort unit 403A-D is configured to sort its received portion of bits to group together the bits identifying addresses belonging to the unique subset identified by the binary classification dataset to generate a respective preliminary binary string 407A-D. The sort units are also configured to order their received bits so that any bits identifying an address belonging to the unique subset form the most significant bits (MSBs) of the generated preliminary binary string. For example, the sort unit 403B receives the input string 0100. The value '1' is associated with, and thus identifies, an address belonging to the unique subset identified by the binary classification dataset. The sort unit 403B therefore operates to place the value '1' as the most significant bit of the preliminary binary string 407B.

Each merge unit 405A and 405B receives a plurality of preliminary binary strings as an input. Specifically, merge unit 405A receives as its input the two preliminary binary strings 407A and 407B generated by sort units 403A and 403B respectively; and merge unit 405B receives as its input the two preliminary binary strings 407C and 407D generated by sort units 403C and 403D respectively. Each merge unit 405A and 405B therefore receives eight bits as its input. Each merge unit 403A and 403B operates to merge its received preliminary binary strings to group together the bits from each received preliminary binary string that identify addresses belonging to the unique subset of addresses and form a merged string. The merge units also sort the bits of the merged string so that the grouped bits identifying addresses belonging to the unique subset form the most significant bits of the merged string. The merge units further discard a number of least significant bits of the merged string to output a further preliminary binary string. The preliminary binary strings formed and output by merge units 405A and 405B are labelled 409A and 409B respectively.

In this example, the merge units 405A and 405B discard the four least significant bits of the merged string. The output of the merge units 405A and 405B is therefore a preliminary binary string of four bits. Thus, each merge unit 405A and 405B receives two preliminary binary strings as inputs, and outputs a further preliminary binary string with a number of bits equal to the number of bits of one of the received preliminary binary strings.

The merge units 405A and 405B therefore operate to generate a preliminary binary string with fewer bits than the number of bits received as an input. The operation of each of the merge units 405A and 405B can be summarised as: i) receive as an input a plurality of preliminary binary strings output by respective sort units; ii) merge the received preliminary binary strings together to generate a merged string in which bits from each received preliminary string that identify addresses belonging to the unique subset are grouped together and form the most significant bits of the merged string; and iii) discard a plurality of least significant bits of the merged string to output a further preliminary binary string with fewer bits than the number of bits received as an input.

The outputs of merge units 405A and 405B are fed as an input to a further merge unit 405C. Merge unit 405C operates to generate an intermediary binary string 411.

The merge unit 405C operates in an analogous way to merge units 405A and 405B. More specifically, merge unit 405C merges the preliminary binary strings 409A and 409B output from merge units 405A and 405B to generate a merged string in which bits from each received preliminary string 409A and 409B that identify addresses belonging to the unique subset are grouped together and form the most significant bits of the merged string; and discards a plurality of least significant bits of the merged string to generate an intermediary binary string 411.

It can be seen that the values of the intermediary binary string 411 are sorted into two groups: a first group of contiguous bits that each identify an input address belonging to the unique subset (the three bits having a value of '1'), and a second group containing (in this example) a single bit that identifies an input address not belonging to the unique subset (the bit having a value of '0'). The bits of the intermediary binary string 411 are sorted, or ordered, so that the bits of the first group form the most significant bits of the intermediary binary output.

Merge unit 405C receives two preliminary four-bit binary strings 409A and 409B, and generates an intermediary binary string with four bits. Thus, merge unit 405C receives as its input two preliminary binary strings output from respective merge units 405A and 405B, and generates an intermediary binary string with a number of bits equal to the number of bits of one of the received preliminary binary strings. The intermediary binary string 411 generated by the combination logic unit 203A therefore contains fewer bits than the number of bits 401 of the binary classification dataset received at the logic unit as an input.

Combination logic unit 203B operates in an analogous manner to logic unit 203A to generate a second intermediary binary string.

The two intermediary binary strings generated by the logic units 203A and 203B are input into the output generating logic 205.

At step 607, the output generating logic 205 selects between bits belonging to the two different intermediary binary strings to generate a binary output identifying a set of memory addresses containing at least one address in the unique subset. The set of memory addresses identified by the binary output may be referred to as an output set of memory addresses.

Figure 5:
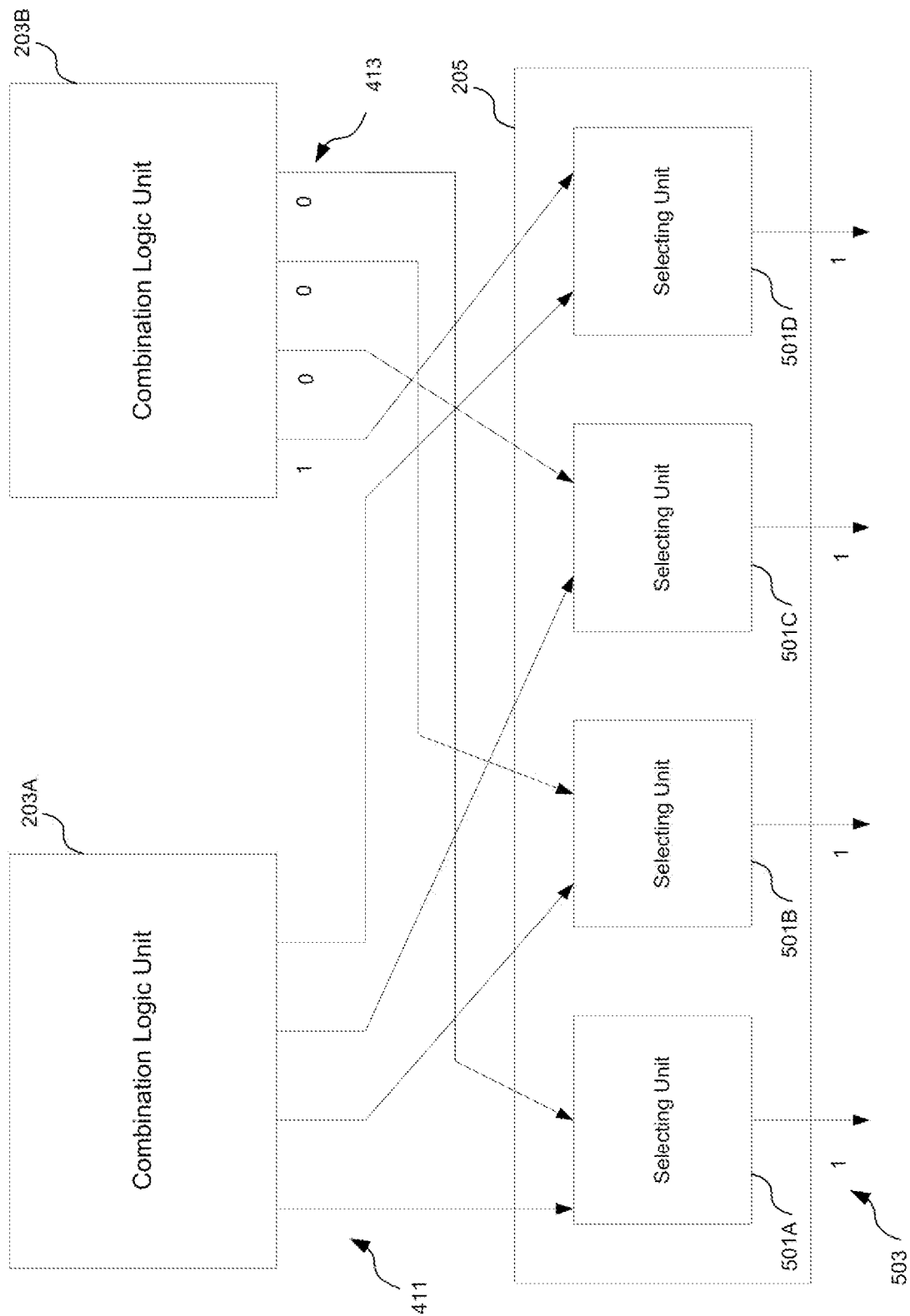
FIG. 5 shows an example of output generating logic forming part of the address sorting unit.

FIG. 5 shows a more detailed view of exemplary output generating logic 205, and illustrates how the output generating logic may select between bits belonging to different intermediary binary strings output from respective combination logic units to generate the binary output 503. The binary output is an M bit output. It may be in the format of an M bit vector. As mentioned above, each bit of the binary output 503 is associated with an address value from the set of N input addresses, and a match mask indicating which addresses in the input set are valid and match that address value.

The logic 205 receives as its input the intermediary binary string 411 output from logic unit 203A and the intermediary binary string 413 output from logic unit 203B. Example values of the intermediary binary strings have been chosen to illustrate the operating principles of the output generating logic 205.

The output generating logic 205 comprises a plurality of selecting units 501A-D that each generate a respective bit of the binary output 503. Each selecting unit 501A-D could be a multiplexer ("mux"), for example. Since the binary output is an M bit output (where M=4 in this example), the output generating logic may contain M selecting units.

Each selecting unit 501A-D is configured to receive a pair of bits from respective intermediary binary strings 411 and 413; that is, each bit in a received pair is from a different intermediary binary string. The selecting unit operates to select one of the received pair of bits as a bit of the binary output 503. Each selecting unit may operate as an OR gate. That is, if one of the input pair of bits is '1', the selecting unit outputs that bit. If both of the input bits are '1', the selecting unit selects one of the bits, either at random, or the selecting unit may be configured to select the bit output from a specified combination logic unit.

The selection units are arranged so that one selecting unit (in this example unit 501A) is configured to receive the most significant bit of the first intermediary binary string 411 and the least significant bit of the second intermediary binary string 413; one of the selecting units (in this example unit 501B) is configured to receive the second MSB of the intermediary string 411 and the second LSB of the second intermediary string 413; one selecting unit (in this example unit 501C) is configured to receive the third MSB of the intermediary string 411 and the third LSB of the intermediary string 413; and one selecting unit (in this example unit 501D) is configured to receive the fourth MSB of the intermediary binary string 411 (which in this example is the LSB of the string 411) and the fourth LSB of the binary string 413 (which in this example is the MSB of string 413).

This arrangement is advantageous because, coupled with the ordered intermediary strings output by the combination logic units, it enables the logic 205 to maximise the amount of bits in the binary output 503 that identify addresses within the unique subset for a given set of input intermediary binary strings. For example, if instead the outputs of the logic units 203A and 203B were paired so that selecting unit 501A received the MSB of both intermediary strings; selecting unit 501B received the second MSB of both intermediary strings etc., then selecting unit 501D would receive a pair of '0' bits as its inputs, meaning the binary output 503 would only contain three '1' bits, instead of four as in the illustrated arrangement.

Which selecting unit receives which combination of outputs from the combination logic units can be varied whilst still maximising the amount of bits in the binary output 503 that identify addresses within the unique subset for a given set of input intermediary binary strings. Thus, in general, the output generating logic 205 may be arranged so that a selecting unit n is configured to select between a bit $b_n$ from a first intermediary binary string, and a bit $b_m$ from a second intermediary binary string, where n=1 . . . M, and m=M+1−n. It is noted here that under this notation, $b_1$ may refer to the most significant bit of an intermediary binary string, and $b_m$ to the least significant bit of the intermediary binary string. It is also noted that under this notation the labelling of the selecting units may be arbitrary. That is, there need not be any correlation between selecting unit n and the bit number of the binary output 503, e.g. selecting unit 1 need not output the MSB of the binary output.

The configuration of the output generating logic 205 means that the bits of the binary output 503 are not ordered (in contrast to, for example, the intermediary strings output by the combination logic units). That is, bit values of '1' and '0' need not be grouped or sorted in any particular order in the binary output 503. In this regard, the operation of the output generating logic 205 can be contrasted with the merge units 405A-C. Each of the merge units and the output generating logic 205 operate to output four bits from a received input of eight bits. However, the output generating logic 205 does not sort, or order, the output bits to group certain bits together, unlike the merge units, which group together bits having a bit value of '1' in their outputs (as illustrated in FIG. 4). The output generating logic 205 may be said to generate a binary output with a loose packing of bits. This is advantageous because it reduces the amount of hardware (e.g. the number of gates and/or MUXs) needed to generate the binary output from the input intermediary strings 411 and 413. Thus, the output generating logic may be implemented in a more hardware-efficient manner than the merge units, reducing the overall hardware requirements of the address sorting unit 105.

The binary output 503 and the associated memory addresses of the unique subset identified by that binary output are input into the memory interface 107. The memory interface can then access regions of the memory 109 specified by those memory addresses.

Once the memory access to those regions of memory has completed, the memory interface 107 can use information from the match mask 311 generated by the comparator block to determine which of the N input memory access requests received by the sorting unit 105 have been completed (e.g. using memory matching logic). For example, it can be seen from the exemplary match mask 311 that accessing the memory address 101101 means both memory request 1 and memory request 6 are completed. The address sorting unit may output the match mask directly to the memory interface. Alternatively, the address sorting unit may further comprise an address matching logic that generates M N-bit masks for each binary output, each N bit mask corresponding to a respective bit of the binary output and indicating which addresses in the set of N input addresses match the output address identified by that bit of the binary output. The address matching logic may be coupled to the comparator block 201 and the output generating logic. The address matching logic may be configured to generate the M masks from the match mask generated by the comparator block 201, and the binary output generated by the output generating logic. The address sorting unit may be configured to output the M N-bit masks, for example to the memory interface unit to determine which of the input memory address requests have been completed.

The above-described approach to generating the binary output 503 means that, if the binary classification dataset generated by the comparator block identifies M or more input addresses as belonging to the unique subset, the combination logic units and output generating logic will operate to generate a binary output 503 that identifies M addresses of that subset. This is advantageous because it means the number of addresses belonging to the unique subset identified by a single binary output is maximised.

It will be appreciated that in some cases the binary classification dataset may identify a number of addresses belonging to the unique subset that is greater than M. In this case, not all the addresses in the subset can be identified in a single binary output. Multiple cycles may therefore need to be performed to generate multiple binary outputs from the same set of N input memory addresses. Whether another cycle is to be performed to generate a further binary output using the same set of input memory addresses may be controlled by an output flag. The output flag may be enabled when it is determined that not all addresses in the unique subset have yet been identified by the binary output(s), and indicates that a further cycle to generate a new binary output is required using the same set of N input addresses. The output flag may be disabled when it is determined that all the addresses in the unique subset have been identified by the generated binary output(s), and indicates that a new set of N input addresses can be received by the address sorting unit 105.

This output flag may be generated by a monitoring unit forming part of the address sorting unit 105. The monitoring unit may be coupled to both the output generating logic and the comparator block. The monitoring unit may determine the number of input addresses in the unique subset from the binary classification dataset, and may monitor the number of those addresses that have been identified by binary outputs generated by the output generating logic. From these parameters, the monitoring unit may generate either a set or non-set output flag that is input into the comparator block.

The above examples describe an address sorting unit with two combination logic units. It will be appreciated that in other examples, the address sorting unit may contain more than two combination logic units. Furthermore, though each combination logic unit is shown as comprising a tree-network structured arrangement of four sort units, two merge units configured to receive the outputs of the sort units, and a single other merge unit configured to receive the output of the two merge units, it will be appreciated that different numbers and arrangements of sort and merge units are possible. The arrangements described herein are convenient when the set of input addresses contains 32 addresses and the set of output addresses contains 4 addresses, but it will be appreciated that other arrangements may be more convenient for differently-sized input and output address sets.

In the examples above, the comparator block 201 is described as operating to compare input addresses at and a; (e.g. using a sequential or parallel scheme). It will be appreciated that the numbers used to label each address (e.g. address '1', address '2' etc.) referenced by may be arbitrarily assigned. That is, the above-described examples may not require a specific number label be assigned to each address, so long as each address within the input set N is labelled uniquely. Moreover, the number labels assigned to each address need not necessarily imply any limitation on the position of that address within the address vector received by the comparator block. In some examples, address '1' may be used to refer to the address occupying the most significant bits of the received address vector, and address 'N' used to refer to the address occupying the least significant bits of the received address vector; in other examples, address '1' may be used to refer to the address occupying the least significant bits of the received address vector, and address 'N' used to refer to the address occupying the most significant bits of the received address vector. Other approaches to labelling the addresses within the address vector are also possible.

The above examples illustrate how an address sorting unit can operate to identify a set of M unique addresses from a larger input set of N addresses, where the input set contains at least one non-unique address. However, it will be appreciated that the examples described herein will equally operate to identify a set of M unique addresses from an input set of N unique addresses. Thus, the set of N input addresses may be unique (i.e. contain no non-unique addresses), or contain at least one non-unique address.

Figure 7:
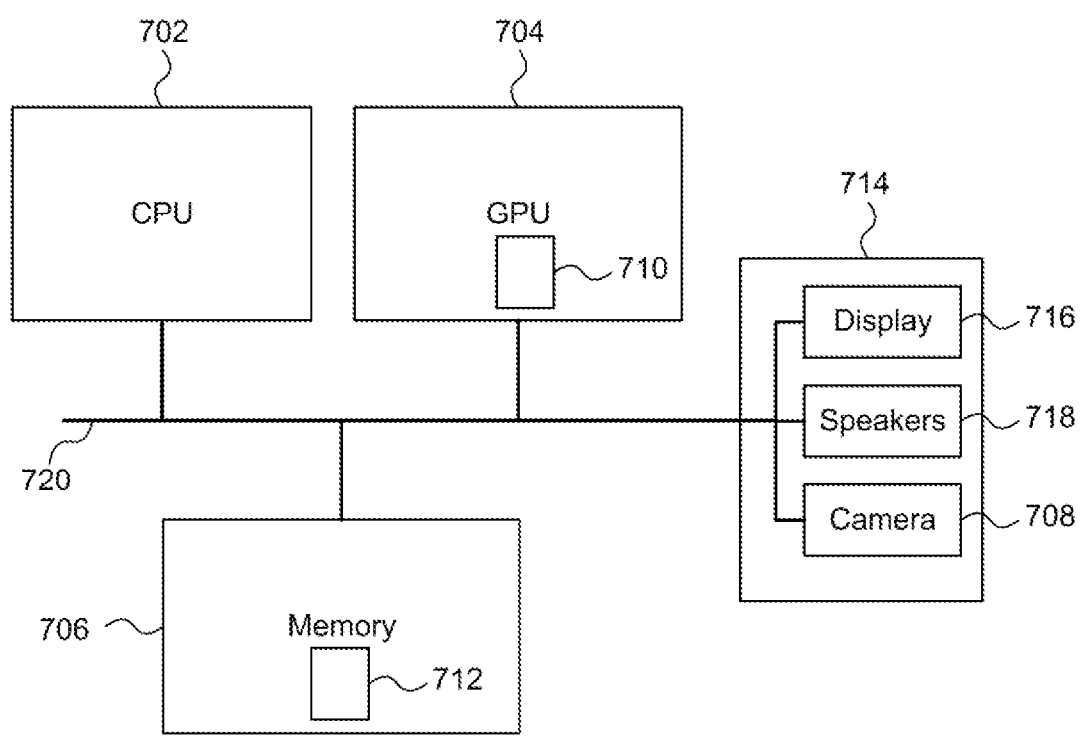
FIG. 7 shows an example computer system.

FIG. 7 shows a computer system in which the graphics processing systems described herein may be implemented. The computer system comprises a CPU 702, a GPU 704, a memory 706 and other devices 714, such as a display 716, speakers 718 and a camera 708. A processing block 710 (e.g. corresponding to address sorting unit 105) is shown implemented on the GPU 704. The components of the computer system can communicate with each other via a communications bus 720. Either or both of CPU 702 and GPU 704 could be SIMD processors. In other examples, the processing block 710 may be implemented on the CPU 702. A store 712 (e.g. corresponding to memory 109) is implemented as part of the memory 706.

The address sorting unit, combination logic unit and output generating logic of FIGS. 2, 4 and 5 are shown as comprising a number of functional blocks. This is schematic only and is not intended to define a strict division between different logic elements of such entities. Each functional block may be provided in any suitable manner. It is to be understood that intermediate values described herein as being formed by a unit, logic or block need not be physically generated by the unit/logic/block at any point and may merely represent logical values which conveniently describe the processing performed by the unit/logic/block between its input and output.

The apparatuses described herein (e.g. the address sorting unit 105 or processing unit 101) may be embodied in hardware on an integrated circuit. The apparatuses described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an apparatus configured to perform any of the methods described herein, or to manufacture an apparatus comprising any apparatus described herein. An integrated circuit definition dataset may be, for example, an integrated circuit description.

There may be provided a method of manufacturing, at an integrated circuit manufacturing system, an apparatus as described herein. There may be provided an integrated circuit definition dataset that, when processed in an integrated circuit manufacturing system, causes the method of manufacturing an apparatus to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an apparatus (e.g. an address sorting unit 105 or processing unit 101) will now be described with respect to FIG. 8.

Figure 8:
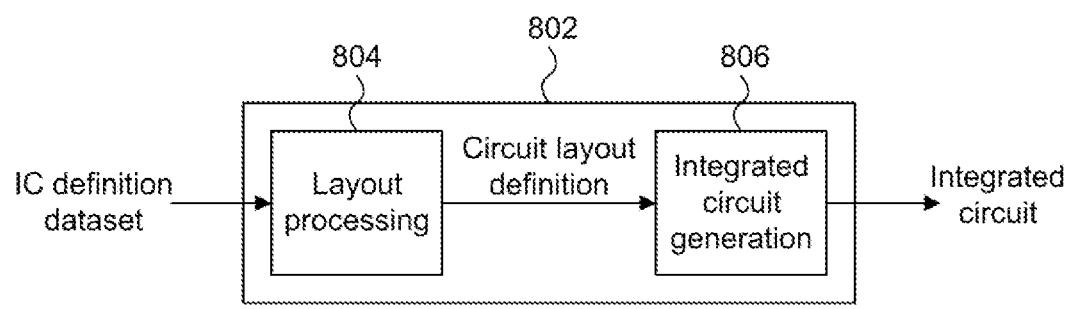
FIG. 8 shows an integrated circuit manufacturing system.

FIG. 8 shows an example of an integrated circuit (IC) manufacturing system 802 which is configured to manufacture an apparatus as described in any of the examples herein. In particular, the IC manufacturing system 802 comprises a layout processing system 804 and an integrated circuit generation system 806. The IC manufacturing system 802 is configured to receive an IC definition dataset (e.g. defining an apparatus as described in any of the examples herein), process the IC definition dataset, and generate an IC according to the IC definition dataset (e.g. which embodies an apparatus as described in any of the examples herein). The processing of the IC definition dataset configures the IC manufacturing system 802 to manufacture an integrated circuit embodying an apparatus as described in any of the examples herein. The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an apparatus without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing systems described herein may be embodied in hardware on an integrated circuit. The graphics processing systems described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An apparatus configured to identify a set of M output memory addresses from a larger set of N input memory addresses, the apparatus comprising:
    a comparator block configured to perform comparisons of memory addresses from a set of N input memory addresses to generate a classification dataset that identifies a subset of unique addresses from the set of input addresses;
    a plurality of combination logic units, each configured to: receive a subset of data from the classification dataset and order the subset of data into two groups, wherein a first group identifies addresses belonging to the subset of unique addresses, and a second group identifies addresses not belonging to the subset of unique addresses; and
    output generating logic configured to select between data belonging to different subsets of data to generate an output identifying at least one address in the subset of unique addresses.

2. An apparatus as claimed in claim 1, wherein the classification dataset is a binary classification dataset, and wherein the subset of data from the classification data is a predetermined selection of bits.

3. An apparatus as claimed in claim 2, wherein ordering the subset of data into two groups comprises sorting the predetermined selection of bits into an intermediary binary string.

4. An apparatus as claimed in claim 3, in which the bits of the intermediary binary string are ordered such that the first group is formed of bits identifying addresses belonging to the subset of unique addresses, and the second group is formed of bits identifying addresses not belonging to the subset of unique addresses.

5. An apparatus as claimed in claim 2, wherein the output generating logic is configured to generate a binary output identifying a set of output memory addresses containing at least one address in the subset of unique addresses.

6. An apparatus as claimed in claim 2, wherein the binary classification dataset comprises N bits, each bit corresponding to a respective input memory address, the value of each bit indicating whether or not the corresponding memory address forms part of the subset of unique addresses.

7. An apparatus as claimed in claim 5, wherein bit(s) of the binary output identifying the at least one address in the subset of unique addresses are unordered within the output.

8. An apparatus as claimed in claim 1, wherein each address in the set of input addresses is associated with a validity identifier indicating whether the address is valid or invalid.

9. An apparatus as claimed in claim 1, wherein each address in the set of input addresses that is not in the subset of unique addresses is at least one of: an invalid address; or equal to one of the addresses in the subset of unique addresses.

10. An apparatus as claimed in claim 1, wherein the set of input memory addresses contains N addresses, and the comparator block is configured to: perform the comparison of input addresses by comparing each address $a_i$ in the set of input memory addresses with each subsequent address $a_j$ in the set of input memory addresses; or
    perform the comparison of input addresses by comparing each address $a_i$ in the set of input memory addresses with each previous address $a_j$ in the set of input memory address.

11. An apparatus as claimed in claim 1, wherein the comparator block is further configured to generate from the comparison of input addresses a match mask indicating, for each input address, which of the other input addresses match that input address, wherein the apparatus further comprises address matching logic configured to identify, using the match mask, each input address that matches the at least one address in the subset of unique addresses that is identified by the output.

12. An apparatus as claimed in claim 5, wherein the binary output is an M-bit output, and the output generating logic is configured to select between bits belonging to different subsets of data to generate an M-bit binary output that identifies M addresses in the subset of unique addresses when the number of addresses in the subset of unique addresses is greater than or equal to M.

13. An apparatus as claimed in claim 3, wherein each combination logic unit is configured to sort its received predetermined selection of bits into an intermediary binary string containing fewer bits than the number of the predetermined selection of bits received by that combination logic unit.

14. An apparatus as claimed in claim 3, wherein each combination logic unit comprises:
a plurality of sort units each configured to:
receive a portion of the received predetermined selection of bits; and
sort the received portion of bits to group together the bits identifying addresses belonging to the identified subset to generate a preliminary binary string; and
one or more merge units, each of the one or more merge units being configured to receive a plurality of preliminary binary strings and to merge those preliminary binary strings to group together the bits from each received preliminary binary string that identify addresses belonging to the identified subset.

15. An apparatus as claimed in claim 5, wherein the output generating logic comprises a plurality of selecting units, each configured to generate a respective bit of the binary output and each selecting unit is configured to select between a pair of bits from respective subsets of data to generate a bit of the binary output.

16. An apparatus as claimed in claim 15, wherein each selecting unit is configured to output a bit that does not identify an address in the subset of unique addresses only in response to receiving a pair of bits that both do not identify an address in the subset of unique addresses.

17. An apparatus as claimed in claim 15, wherein each selecting unit is associated with a pair of combination logic units and is configured to select between a pair of bits from respective subsets of data formed by those pair of combination logic units.

18. An apparatus as claimed in claim 3, wherein each combination logic unit is configured to sort its received predetermined selection of bits into an intermediary binary string of M bits, wherein each selecting unit n is configured to select between a bit $b_n$ from a first intermediary binary string, and a bit $b_m$ from a second intermediary binary string, where n=1, ... M, and m=M+1−n.

19. A method of identifying a set of M output memory addresses from a larger set of N input memory addresses comprising:
performing a comparison of memory addresses from a set of N input memory addresses to generate a classification dataset that identifies a subset of addresses from the set of unique input addresses;
at each of a plurality of combination logic units: receiving a subset of data from the classification dataset and order the subset of data into two groups wherein a first group identifies addresses belonging to the subset of unique addresses, and a second group identifies addresses not belonging to the subset of unique addresses; and
selecting between data belonging to different subsets of data to generate an output identifying at least one address in the subset of unique addresses.

20. A non-transitory computer readable storage medium having stored thereon a computer readable dataset description of an integrated circuit that, when processed in an integrated circuit manufacturing system, causes the integrated circuit manufacturing system to manufacture an apparatus configured to identify a set of M output memory addresses from a larger set of N input memory addresses, the apparatus comprising:
a comparator block configured to perform comparisons of memory addresses from a set of N input memory addresses to generate a classification dataset that identifies a subset of unique addresses from the set of input addresses;
a plurality of combination logic units, each configured to: receive a subset of data from the classification dataset and order the subset of data into two groups, wherein a first group identifies addresses belonging to the subset of unique addresses, and a second group identifies addresses not belonging to the subset of unique addresses; and
output generating logic configured to select between data belonging to different subsets of data to generate an output identifying at least one address in the subset of unique addresses.

* * * * *